United States Patent
Coq et al.

(10) Patent No.: US 9,735,564 B1
(45) Date of Patent: Aug. 15, 2017

(54) PROTECTION AGAINST ABNORMAL OVERPOWER OF ELECTRICAL EQUIPMENT

(71) Applicant: International Business Machines Corporation, Armonk, NY (US)

(72) Inventors: Marc H. Coq, Hopewell Junction, NY (US); Richard J. Fishbune, Rochester, MN (US); Mark E. Maresh, Wake Forest, NC (US); Eric B. Swenson, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/337,839

(22) Filed: Oct. 28, 2016

(51) Int. Cl.
  *H02H 3/38* (2006.01)
(52) U.S. Cl.
  CPC ..................... *H02H 3/38* (2013.01)
(58) Field of Classification Search
  CPC .......................................................... H02H 3/38
  USPC .......................................................... 361/62
  See application file for complete search history.

(56) References Cited

U.S. PATENT DOCUMENTS

| | | | |
|---|---|---|---|
| 4,012,669 A | 3/1977 | Gelfand et al. | |
| 4,745,542 A | 5/1988 | Baba et al. | |
| 6,201,371 B1 | 3/2001 | Kawabe et al. | |
| 6,281,602 B1* | 8/2001 | Got | H02J 1/06 |
| | | | 307/18 |
| 6,426,886 B1 | 7/2002 | Goder | |
| 6,580,593 B2 | 6/2003 | Balakrishnan | |
| 6,727,435 B1* | 4/2004 | Egan | H05K 1/0265 |
| | | | 174/250 |
| 8,054,599 B2 | 11/2011 | Dishman et al. | |
| 8,346,494 B2 | 1/2013 | Niwa et al. | |
| 2005/0125711 A1* | 6/2005 | Gattiker | G01R 31/3008 |
| | | | 714/47.1 |
| 2007/0096562 A1 | 5/2007 | Bainbridge et al. | |
| 2010/0007998 A1* | 1/2010 | Dishman | H02H 3/42 |
| | | | 361/18 |
| 2010/0027169 A1 | 2/2010 | Knott et al. | |
| 2011/0133743 A1* | 6/2011 | Barton | F03D 17/00 |
| | | | 324/415 |

FOREIGN PATENT DOCUMENTS

WO  2016044719 A1  3/2016

* cited by examiner

*Primary Examiner* — Thienvu Tran
*Assistant Examiner* — Kevin J Comber
(74) *Attorney, Agent, or Firm* — Cantor Colburn LLP; Damion Josephs

(57) ABSTRACT

A system protects electrical equipment. The system includes a backplane including electrically communicative inputs and outputs, input and output wiring, input and output detectors and a processor. Power sources respectively connect with corresponding inputs by way of the input wiring. The input detectors are respectively disposed on the input wiring to detect an amount of power provided from each of the power sources. Each of the outputs respectively connects with a corresponding load by way of the output wiring. The output detectors are respectively disposed on the output wiring to detect an amount of power provided from each of the outputs. The processor is configured to determine a relationship between the detected amounts of power and to take an action relative to at least one of the power sources based on the determined relationship.

18 Claims, 7 Drawing Sheets

PROTECTION AGAINST ABNORMAL OVERPOWER OF ELECTRICAL EQUIPMENT

BACKGROUND

The present invention relates to electrical equipment and, more specifically, to the protection of the electrical equipment against damage due to abnormal overpower conditions being in effect.

A computer system backplane is typically a multi-layer substrate that includes a plurality of conductive layers interleaved with a plurality of dielectric layers. The backplane carries parallel multi-terminal sockets that receive, in an edgewise manner, circuit boards on which computer system components are constructed. Some of the backplane conductive layers are used for signal propagation while other conductive layers are used to distribute power necessary for system operations. These conductive layers are known as "power-planes" and are generally provided in the form of solid sheets of conductive material.

Each multi-terminal socket typically includes a plurality of pins that pass through small, plated vias that are bored through the layers of the backplane. Each pin makes contact with a desired one of the backplane conductive layers. Where no connection to a particular conductive layer is desired, a region surrounding that via and through that conductive layer is insulated to prevent the pin from making contact. The plated vias are sized relative to the connector pins for a press fit. Power supply connections are made in a generally similar manner.

In each power-plane, some of the plated vias make contact with load pins. These are pins that are coupled to the circuit boards received by the sockets. Other vias are connected to source pins. These are pins that are coupled to one or more power supplies.

SUMMARY

According to an embodiment of the present invention, a system protects electrical equipment. The system includes a backplane including electrically communicative inputs and outputs, input and output wiring, input and output detectors and a processor. Power sources respectively connect with corresponding inputs by way of the input wiring. The input detectors are respectively disposed on the input wiring to detect an amount of power provided from each of the power sources. Each of the outputs respectively connects with a corresponding load by way of the output wiring. The output detectors are respectively disposed on the output wiring to detect an amount of power provided from each of the outputs. The processor is configured to determine a relationship between the detected amounts of power and to take an action relative to at least one of the power sources based on the determined relationship.

According to another embodiment of the present invention, a system protects electrical equipment. The system includes power sources, loads and a backplane including electrically communicative inputs and outputs. The system also includes input and output wiring, input and output detectors and a processor. Each power source connects with a corresponding input by way of the input wiring. The input detectors are respectively disposed on the input wiring to detect an amount of power provided from each power source to the corresponding input. Each output connects with a corresponding load by way of the output wiring. The output detectors are respectively disposed on the output wiring to detect an amount of power provided from each output to the corresponding load. The processor is coupled to the input and output detectors and is configured to determine a relationship between the detected amounts of power and to take an action relative to at least one of the power sources based on the determined relationship.

According to yet another embodiment of the present invention, a method of protecting electrical equipment is provided in a system. The system includes power sources, loads and a backplane that includes electrically communicative inputs and outputs. The method includes detecting, along input wiring, an amount of power provided from power sources to a corresponding input and detecting, along output wiring, an amount of power provided from each output to a corresponding load. The method further includes determining a relationship between the detected amounts of power and taking an action relative to at least one of the power sources based on the determined relationship.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a system and a method are provided to prevent damage to electrical equipment. While it is common for electrical equipment to have a pass-through-device, such as a printed circuit board (PCB) or a printed wiring board (PWB), where the pass-through-device distributes power from one or more power sources and connects the power to one or more loads, the sources cannot determine if the power they are delivering is being consumed by the loads as would be expected in a properly functioning system or if instead the power is being consumed by the pass-through-device being faulty. Thus, absent the system and method described herein, in an event the pass-through-device is faulty, the fault(s) could be undetected and possibly lead to damage and failure of the equipment.

Figure 1:
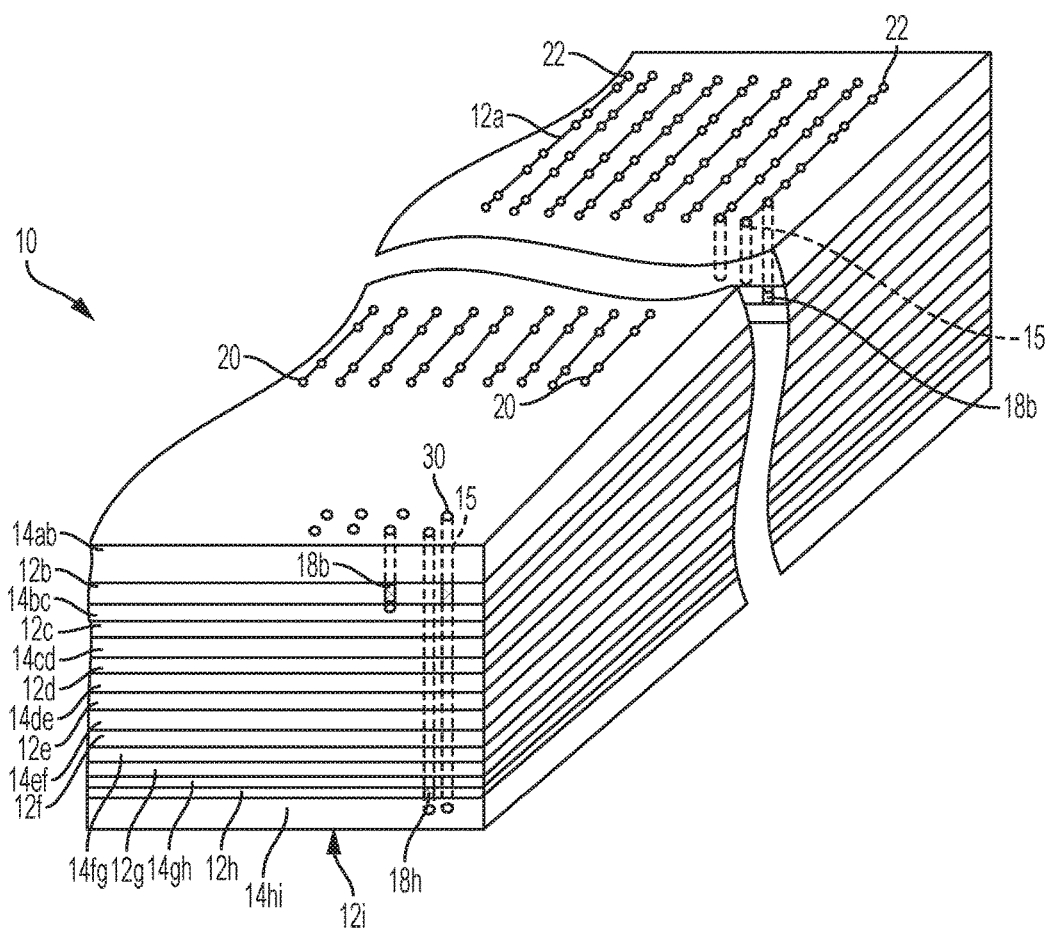
FIG. 1 is a sectioned, perspective view of a backplane in accordance with embodiments.

With reference to FIG. 1, a backplane 10 for use in a system requiring power distribution (e.g., a computer system) is provided. The backplane 10 is a laminated structure that includes a plurality of alternating conductive layers 12*a-i* interleaved with dielectric layers 14*ab-hi*. The conductive layers 12*a-i* may be implemented with copper, gold, silver-palladium, alloy, tungsten, etc. The dielectric layers 14*ab-hi* may be fiberglass-epoxy composites. The conductive layers 12*a-i* and the dielectric layers 14*ab-hi* may be numbered such that each one of the conductive layers 12*a-i* has a single letter associated with it and each of the dielectric layers 14*ab-hi* has the two letters that are associated with the immediately neighboring ones of the conductive layers 12*a-i* associated with it. The conductive layers 12*a-i* may be less than 50 microns thick (the thickness of the backplane 10 in FIG. 1 has been exaggerated in order to show the various layers clearly).

The backplane 10 provides electrical communications between one or more power sources and various functional units or loads. For example, in a given computer system, the functional units may be circuit boards carrying electrical components. Some of the conductive layers 12*a-i* may be signal layers for signal propagation while other layers may be power-planes for providing particular direct current (DC) voltage levels to the functional units. For example, in computer systems, the DC voltage levels are typically 5 volts, 3.3 volts or even lower. In the exemplary embodiment, conductive layers 12*a* and 12*i* are signal layers and layers 12*b-h* are power-planes.

The backplane 10 is provided with an array of locations for coupling the backplane 10 to functional units. Such locations may be connector straps or pads, wiring networks, etc. In exemplary embodiments, the locations may be holes or vias 15 which receive load pins that will be mechanically and electrically positioned relative to load locations 20 and 22 and to source locations 30. The number of load locations 20, 22 and the number of source locations 30 may vary according to the environment in which the backplane 10 is used. In some computer systems, the number of load locations 20, 22 depends on the number of circuit boards to be plugged into the backplane 10 as well as the power requirements of the circuit boards and the current carrying capability of the pins. The number of source locations 30 depends on similar variables. Load locations 20, 22 and source locations 30 may extend through the layers of backplane 10 and into sockets mounted on the backplane 10. The sockets may include resilient contacts for coupling the contacts on a functional unit (e.g., a circuit board or a power supply) to the load locations 20, 22 or to the source locations 30.

Pins may be press fit into or soldered or bolted to the load locations 20, 22 and the source locations 30 of the backplane 10. Alternatively, the functional units may include the pins for insertion into the array of vias 15 provided by the backplane 10. The vias 15 may be plated so that a corresponding pin makes contact with a desired one of the backplane conductive layers (whether a signal layer or a power-plane, see 18*b* and 18*h* in FIG. 1 where plated vias contact conductive layers 12*b* and 12*h*, respectively). Where connection to a given layer is not desired, a region may be provided to surround the hole through that particular conductive layer to thereby insulate the conductive layer from the pin. Thus, the backplane 10 may have an array of vias passing through the power-planes but making electrical contact with only certain conductive layers.

Figure 2:
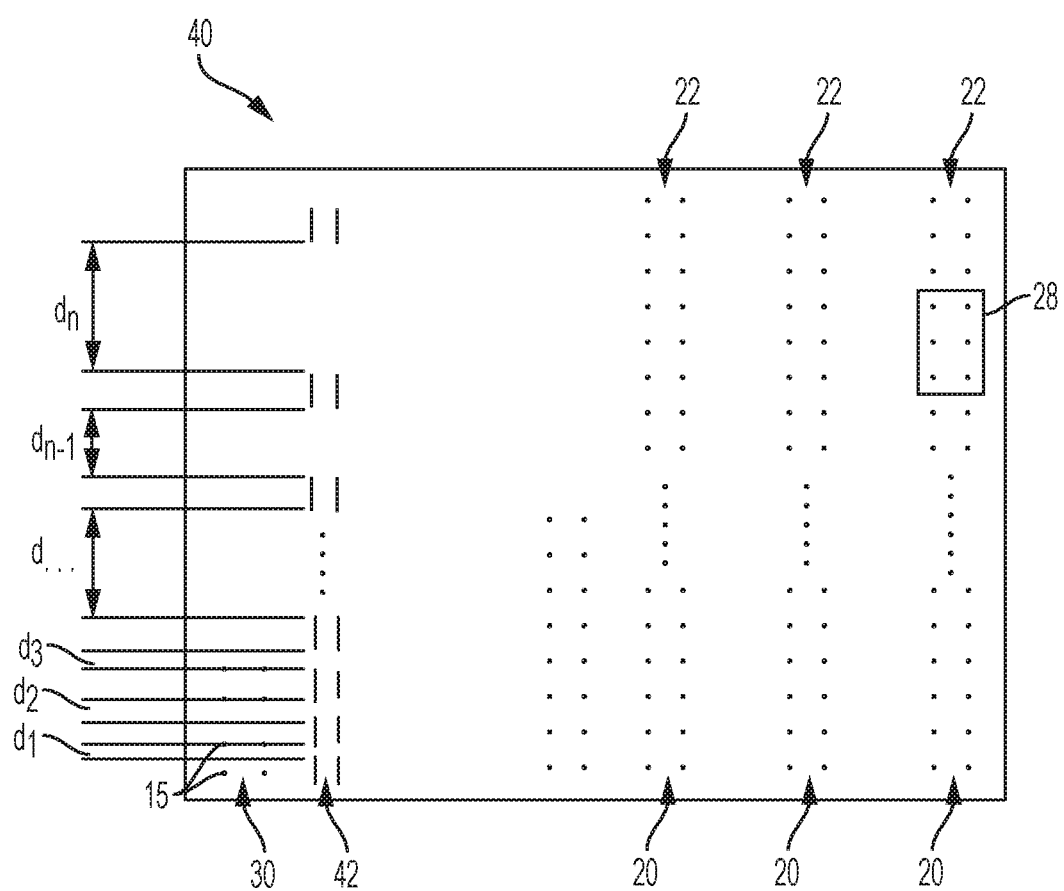
FIG. 2 is a plan view of a power-plane conductive layer of a backplane in accordance with embodiments.

FIG. 2 illustrates a power-plane 40 receiving connection pins at the load locations 20, 22 and the source locations 30 for distributing power from power sources to functional units or loads. A functional unit may also be coupled to the power-plane 40 by means of connector straps or pads or a wiring network 28. The power-plane 40 is provided with the array of vias 15, as mentioned above, and may be provided with a plurality of resistances or impedance variations 42.

Figure 3:
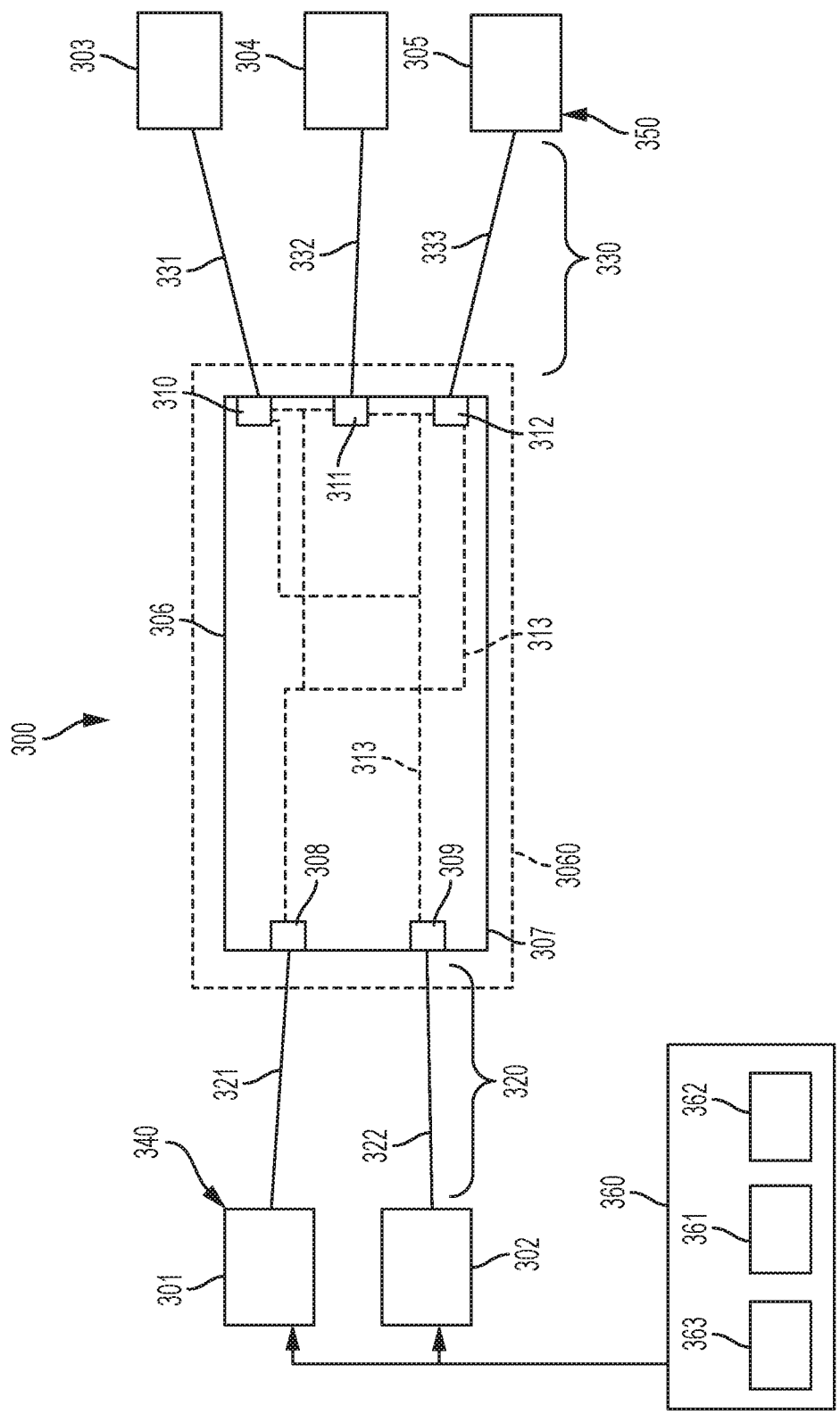
FIG. 3 is a schematic illustration of a system to protect electrical equipment during overpower conditions in accordance with embodiments.
Figure 4:
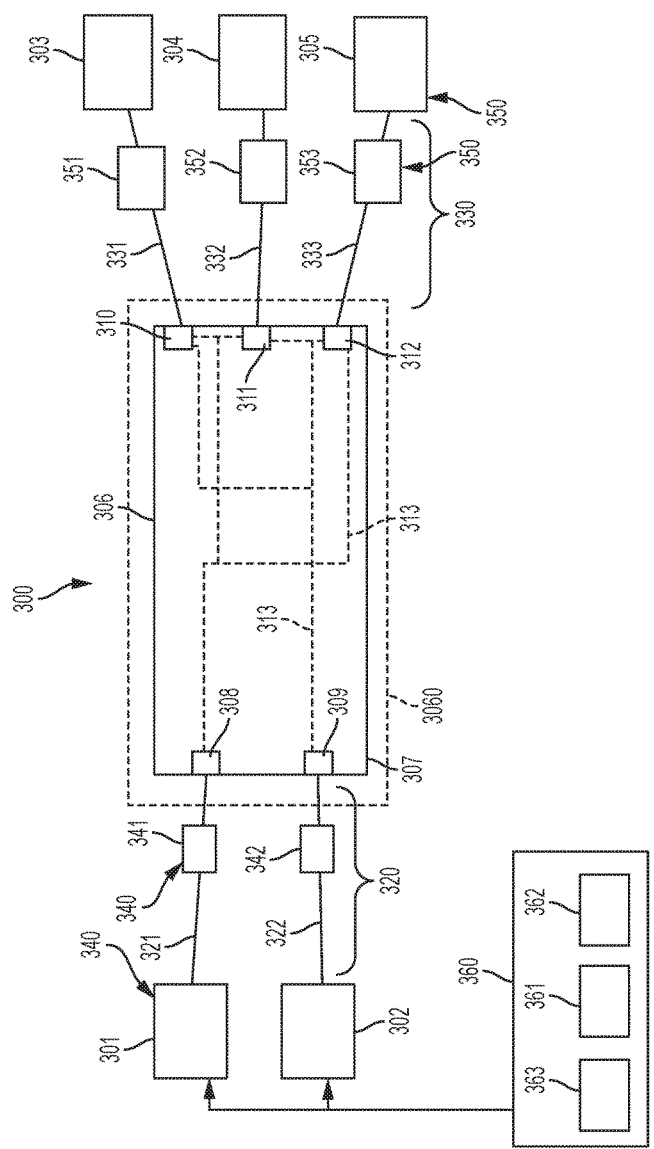
FIG. 4 is a schematic illustration of a system to protect electrical equipment during overpower conditions in accordance with alternative embodiments.

With reference to FIGS. 3 and 4, a system 300 is provided to protect electrical equipment. The system 300 includes at least first and second power sources 301 and 302, at least first, second and third loads 303, 304 and 305 and a backplane 306.

At least one of the first and second power sources 301 and 302 may be provided as an electrical grid with the other of the first and second power sources 301 and 302 being provided as a battery. In any case, the power provided by the first and second power sources 301 and 302 may be provided in the form of direct current (DC) or alternating current (AC). For purposes of clarity and brevity, the following description will relate to the case where the first power source 301 is an electric grid, the second power source 302 is a battery and the power provided by both is provided in the form of DC. However, it is to be understood that this is merely exemplary and that other embodiments exist.

The backplane 306 is similar to the backplane 10 described above with reference to FIGS. 1 and 2 and is provided as a PWB-type of pass-through device 307 with multiple conductive layers interleaved with multiple dielectric layers. The backplane 306 further includes at least first and second input lead elements 308 and 309, at least first, second and third output lead elements 310, 311 and 312 and power distribution elements 313. The power distribution elements 313 are supportively disposed on the pass-through device 307 within one or more of the multiple conductive layers and provide for electrical communication between each of the first and second input lead elements 308 and 309 and at least one or more of the first, second and third output lead elements 310, 311 and 312.

The backplane 306 may be housed within a housing 3060 of a computing device or another similar device. At least one or both of the first and second power sources 301 and 302 is external to the housing 3060. That is, as shown in FIGS. 3 and 4, at least the first power source 301 is external to the housing 3060.

The system 300 further includes input wiring 320, output wiring 330, input detectors 340 and output detectors 350.

The input wiring 320 serves to connect each of the first and second power sources 301 and 302 with a corresponding one of the first and second input lead elements 308 and 309. That is, the input wiring 320 includes a first individual input wiring element 321 that connects the first power source 301 with the first input lead element 308 and a second individual input wiring element 322 that connects the second power source 302 with the second input lead element 309. The output wiring 330 serves to connect each of the first, second and third output lead elements 310, 311 and 312 with a corresponding one of the first, second and third loads 303, 304 and 305. That is, the output wiring 330 includes a first individual output wiring element 331 that connects the first output lead element 310 with the first load 303, a second individual output wiring element 332 that connects the second output lead element 311 with the second load 304 and a third individual output wiring element 333 that connects the third output lead element 312 with the third load 305.

The input detectors 340 are respectively disposed to detect an amount of power provided from each of the first and second power sources 301 and 302. As shown in FIG. 3, the input detectors 340 can be incorporated in the first and second power sources 301 and 302 themselves. Alternatively, as shown in FIG. 4, the input detectors 340 can be provided as a first input detector 341 and as a second input detector 342. In this case, the first input detector 341 may be operably disposed along the first individual input wiring element 321 to detect an amount of power provided by the first power source 301 to the first input lead element 308 and the second input detector 342 may be operably disposed along the second individual input wiring element 322 to detect an amount of power provided by the second power source 302 to the second input lead element 309.

The output detectors 350 are respectively disposed to detect an amount of power provided from each of the first, second and third output lead elements 310, 311 and 312. As shown in FIG. 3, the output detectors 350 can be incorporated in the first, second and third loads 303, 304 and 305 themselves. Alternatively, as shown in FIG. 4, the output detectors 350 can be provided as a first output detector 351, as a second output detector 352 and as a third output detector 353. In this case, the first output detector 351 may be operably disposed along the first individual output wiring element 331 to detect an amount of power provided from the first output lead element 310 to the first load 303, the second output detector 352 may be operably disposed along the second individual output wiring element 332 to detect an amount of power provided from the second output lead element 311 to the second load 304 and the third output detector 353 may be operably disposed along the third individual wiring element 333 to detect an amount of power provided from the third output lead element 312 to the third load 305.

In the cases illustrated in both FIGS. 3 and 4, the system 300 further includes a processor 360. The processor 360 includes a processing unit 361, a memory unit 362 and a networking unit 363 which is coupled to the input and output detectors 340 and 350. The memory unit 361 has executable instructions stored thereon, which, when executed, cause the processing unit 361 to execute the actions, algorithms and methods provided herein. In general, when executed, the executable instructions cause the processing unit 361 to determine a relationship between the detected amounts of power (as detected by the input and output detectors 340 and 350) and to take an action relative to at least one of the first and second power sources 301 and 302 based on a characteristic or nature of the determined relationship.

In greater detail, when they are executed, the executable instructions cause the processing unit 361 to execute the following operations. Initially, the processing unit 361 receives from the networking unit 363 the detected amounts of power provided by each of the first and second power sources 301 and 302 as detected by the input detectors 340 as a whole (see FIG. 3) or by the first and second input detectors 341 and 342 (see FIG. 4) as well as the detected amounts of power provided from each of the first, second and third output lead elements 310, 311 and 312 as detected by the output detectors 350 as a whole (see FIG. 3) or by the first, second and third output detectors 351, 352 and 353 (see FIG. 4). The processing unit 361 then sums the detected amounts of power provided by the first and second power sources 301 and 302 to arrive at a first summation result and sums the detected amounts of power provided from the first, second and third output lead elements 310, 311 and 312 to arrive at a second summation result. At this point, the processing unit 361 obtains a difference between the first and second summation results and subsequently effects the taking of the action relative to the at least one of the first and second power sources 301 and 302 based on the difference exceeding a predefined threshold.

In accordance with embodiments, the predefined threshold may be representative of a 0% difference between the first and second summation results (i.e., power provided into the backplane 306 equals power out of the backplane 306) or a greater than 0% differential. In any case, the predefined threshold may be changed, modified or updated manually or automatically based on current or historical conditions.

In accordance with further embodiments, the action taken with respect to the at least one of the first and second power sources 301 and 302 may include at least one or more of a switching off of the at least one of the first and second power sources 301 and 302, a lowering of the level of provided power and an issuance of an alert to an operator or a user. In the first scenario, a switching element may be provided downstream from the at least one of the first and second power sources 301 and 302 that is being switched off. Similarly, in the second scenario, a controllable resistive element may be provided downstream from the at least one of the first and second power sources 301 and 302 that is having its level of provided power reduced.

Figure 5:
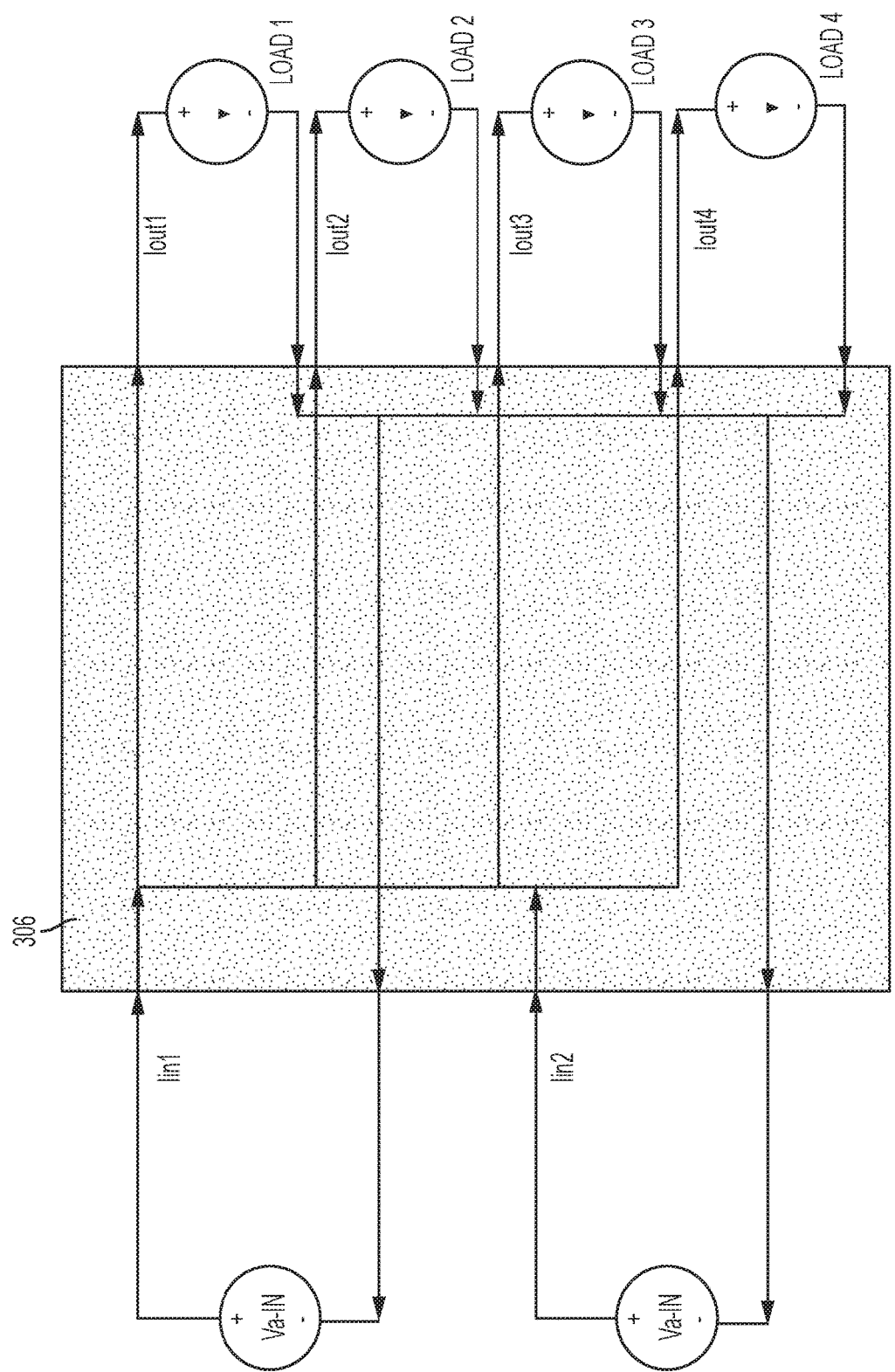
FIG. 5 is a schematic illustration of a particular system in which a backplane is provided between two sources and four loads and is functioning properly.
Figure 6:
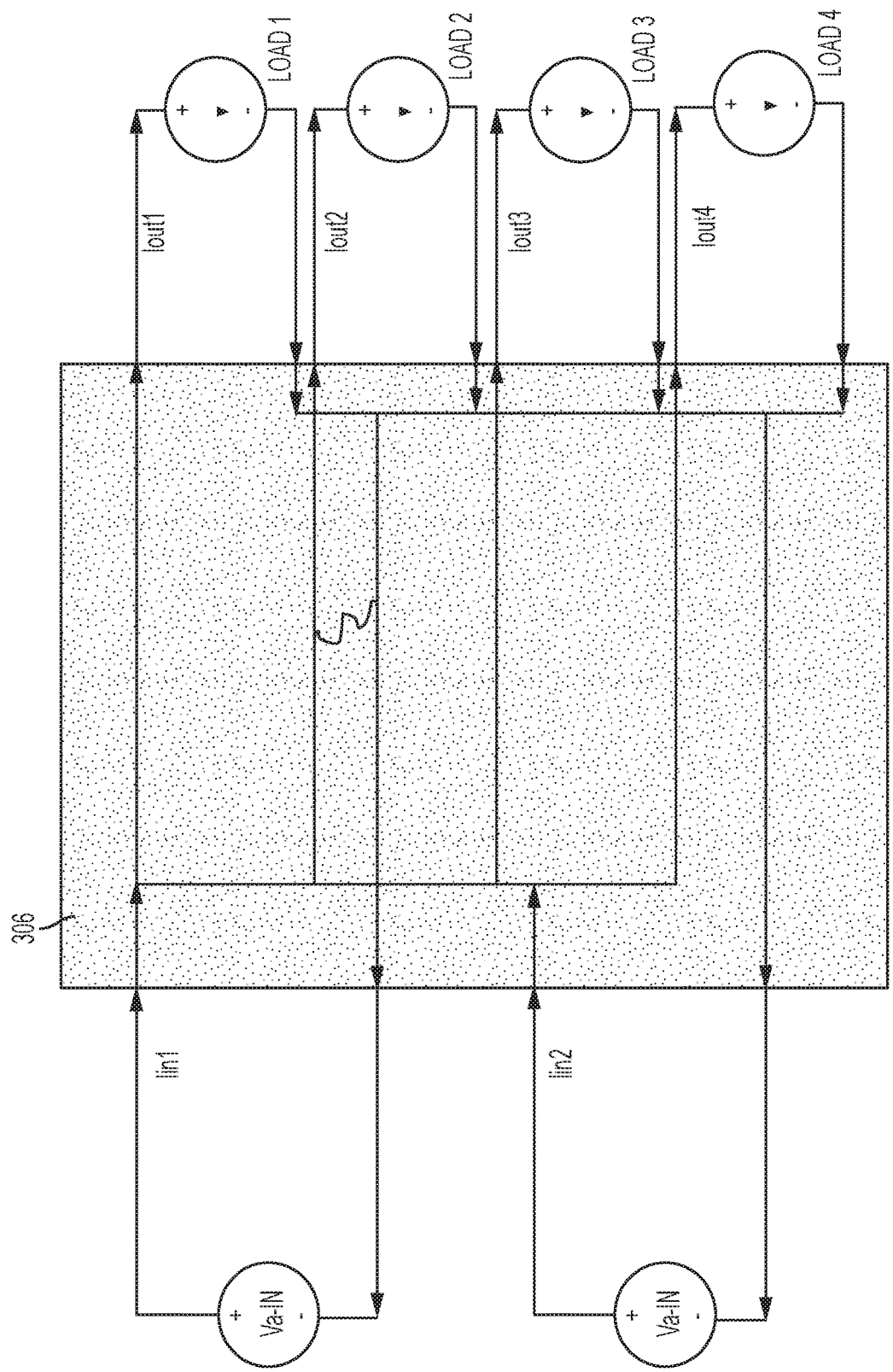
FIG. 6 is a schematic illustration of the particular system where the backplane has developed a short and is functioning improperly.

With the configurations described above, an exemplary case of a backplane 306 is described below with reference to FIGS. 5 and 6. As shown in FIGS. 5 and 6, two power sources are disposed to provide power to four loads via the backplane 306 which acts as a pass-through device. In both FIGS. 5 and 6, the two sources are each capable of delivering +12V output voltage with up to 1400 W of power in parallel to the combined four loads via the backplane 306 and will self-protect in an event the total load exceeds 1400 W. The four loads are receptive of the provided power in parallel but only actually require a total of 1000 W (4×250 W).

In the case of FIG. 5, the backplane 306 is functioning as a pass-through device and is assumed to be operating correctly such that the two power sources deliver a total of 1000 W to the backplane 306 with that 1000 W being distributed by the backplane 306 in turn to each of the four loads. The distributed power is then consumed and dispersed by the four loads. However, in the case of FIG. 6, the backplane 306 is assumed to have developed a short circuit between proximal distribution elements 313. As an example, the short circuit may be a 1 ohm resistive short circuit drawing 12 A (12 A×12 volts=144 W). The short circuit could, for example, pass through substrate elements disposed between voltage planes and could be caused by metallic dendritic growth, contamination, drill mis-registrations, burrs, etc. In any case, as a result of the short circuit, the two power sources will provide a total of 1144 W to the backplane 306 even though the loads will only actually draw and consume 1000 W from the backplane 306. An overpower condition is thus currently in effect in the case of FIG. 6 and, unless the situation is addressed, the consumption of the 144 W by the short circuit will increase local temperatures at the backplane 306 and could lead to further damage to the backplane 306 or other proximal computing device elements.

For each of the cases illustrated in FIGS. 5 and 6, deployment of the input detectors 340, the output detectors 350 and the processor 360 will offer an operator or user an ability to determine when an overpower condition is in effect and may provide a solution to such condition at least until the backplane 306 can be fixed or replaced. That is, for the case of FIG. 6, the processor 360 will be able to identify that a total of 1144 W are provided into the backplane 306 but that only 1000 W are distributed to the loads. The processor 360 could, therefore, take the action described above to forestall damage.

Figure 7:
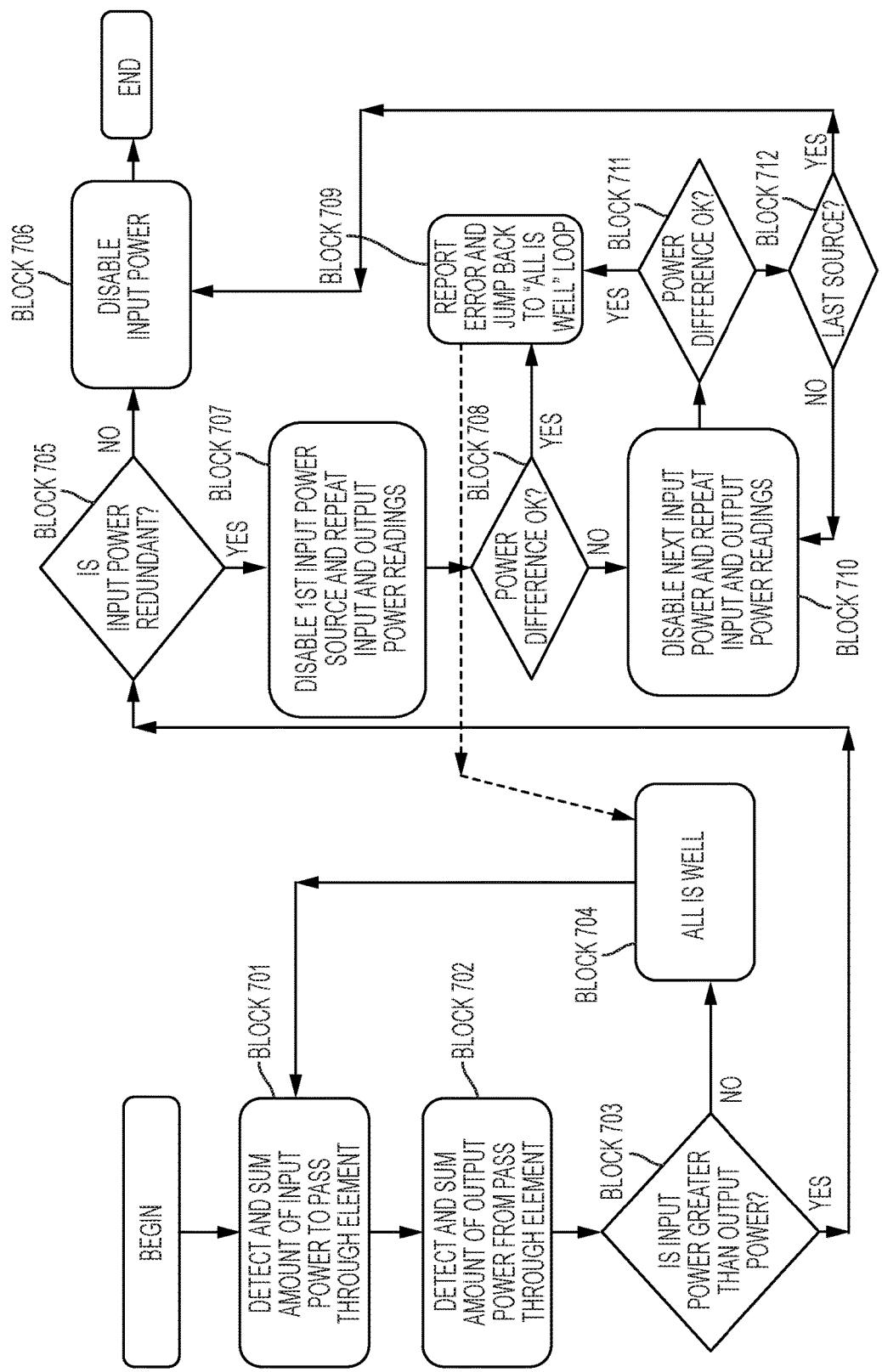
FIG. 7 is a flow diagram that illustrates a method of protecting electrical equipment in accordance with embodiments.

With reference to FIG. 7, a method of protecting electrical equipment in a given system is provided. The given system includes power sources, loads and a backplane. The backplane functions as a pass-through device and includes inputs and outputs, which are electrically communicative by way of distribution elements disposed on the backplane. Upon initiation, the method includes detecting a summing amounts of power provided into the backplane (block 701) and detecting and summing amounts of power provided from the backplane (block 702). The method then includes a determination of whether input power is greater than output power relative to the backplane (block 703) and, in an event that input power is not greater than output power, an ok condition will be set (block 704) with control reverting to block 701.

In an even that input power is greater than output power, the method includes a determination of whether the input power is provided in redundant systems (block 705) and, in an event the input power is not provided in redundant systems, the input power will be disabled (block 706) and the method will end. On the other hand, in an event the input power is provided in redundant systems, the method will then disable a first one of the redundant systems and repeat the power detections and summations operations (block 707) whereupon a determination will be made as to whether any remaining power differential between input and output power is acceptable or within predefined limits (block 708). In an event it is found that the remaining power differential between input and output power is acceptable or within predefined limits, an error is reported (block 709) and control will revert to block 704.

In an event it is found that the remaining power differential between input and output power is not acceptable or exceeds predefined limits, the method will disable a next one of the redundant systems and repeat the power detections and summations operations (block 710) whereupon a determination will be made as to whether any remaining power differential between input and output power is acceptable or within predefined limits (block 711). In an event it is found that the remaining power differential between input and output power is acceptable or within predefined limits, control will revert to block 709 and then to block 704 in sequence. However, in an event it is found that the remaining power differential between input and output power is not acceptable or exceeds predefined limits, the method will determine whether the next one of the redundant systems is the last power source (block 712) and control will revert to block 710 in an event another power source is available or to block 706 in an event that no other power source is available.

The method of FIG. 7 does not include the possibilities of the redundant power systems having their provided power reduced by a resistive element or the predefined thresholds or limits being manually or automatically changed, modified or updated. However, it is to be understood that these potential features of the method are described herein and could be incorporated into the various blocks and operations illustrated in the flow diagram.

In accordance with further embodiments, the backplane 306 may be configured at least in part as a reconfigurable element similar to a field programmable gate array (FPGA) with the processor 360 or another processing unit operably coupled thereto. In such cases, where an exemplary short circuit occurs as in FIG. 6 and the processor 360 takes the action relative to the at least one of the first and second power sources 301 and 302, the processor 360 (and/or the another processing unit) may also control the backplane 306 to cause a reconfiguration thereof. For example, the processor 360 may cause the backplane 306 to generate alternative pathways of power distribution elements 313 whereby the short circuit is bypassed on one or both sides thereof. The resulting configuration of the backplane 306 is then returned to normal operation and the action taken by the processor 360 relative to the at least one of the first and second power sources 301 and 302 can be continued or discontinued.

In accordance with further aspects, a computer program product is provided for deployment in a system to protect electrical equipment. Here, the system includes power sources, loads and a backplane. The backplane includes electrically communicative inputs and outputs. The system further includes input wiring by which each power source connects with a corresponding input, input detectors respectively disposed on the input wiring to detect an amount of power provided from each power source to the corresponding input, output wiring by which each output connects with a corresponding load and output detectors respectively disposed on the output wiring to detect an amount of power provided from each output to the corresponding load. The computer program product includes a processor that is coupled to the input and output detectors and a memory unit. The memory unit has executable instructions stored thereon, which, when executed, cause the processor to determine a relationship between the detected amounts of power and to take an action relative to at least one of the power sources based on the determined relationship.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system to protect electrical equipment, comprising:
 a backplane comprising conductive layers interleaved with dielectric layers, electrically communicative inputs and outputs and power distribution elements supportively disposed within multiple conductive layers by which each input is electrically communicative with at least one or more outputs;
 input wiring by which power sources respectively connect with corresponding inputs;
 input detectors respectively disposed on the input wiring to detect an amount of power provided from each of the power sources;
 output wiring by which each of the outputs respectively connects with a corresponding load;
 output detectors respectively disposed on the output wiring to detect an amount of power provided from each of the outputs; and
 a processor configured to determine that a relationship between the detected amounts of power is indicative of a fault of the power distribution elements and to take an action relative to at least one of the power sources to mitigate the fault based on the determined relationship.

2. The system according to claim 1, wherein:
 the power sources comprise a battery and an electric grid; and
 current provided from the power sources and current provided to the loads is alternating current (AC) or direct current (DC).

3. The system according to claim 1, further comprising a housing disposed to house the backplane, wherein at least one of the sources is external to the housing.

4. The system according to claim 1, wherein:
the input wiring comprises an individual input wiring element, on which one of the input detectors is disposed, to respectively connect each of the power sources with the corresponding inputs, and
the output wiring comprises an individual wiring element, on which one of the output detectors is disposed, to respectively connect each of the outputs with the corresponding loads.

5. The system according to claim 1, wherein:
the input wiring comprises an individual input wiring element, on which one of the input detectors is disposed, to respectively connect each of the power sources with the corresponding inputs; and
the output wiring comprises an individual wiring element, on which one of the output detectors is disposed, to respectively connect each of the outputs with the corresponding loads.

6. The system according to claim 1, wherein the processor:
sums the detected amounts of power provided from each of the power sources to arrive at a first summation result;
sums the detected amounts of power provided from each of the outputs to arrive at a second summation result;
obtains a difference between the first and second summation results; and
effects the taking of the action relative to the at least one of the power sources based on the difference exceeding a predefined threshold, wherein the taking of the action comprises:
determining whether the power provided from each of the power sources is provided redundantly or from a non-redundant system;
if the power is provided from the non-redundant system, disabling the non-redundant system; and
if the power is provided redundantly, sequentially disabling redundant systems until the difference does not exceed the predefined threshold.

7. The system according to claim 6, wherein the predefined threshold is a 0% or greater differential and is updateable.

8. The system according to claim 1, wherein:
the fault comprises a short circuit passing between voltage planes of proximal power distribution elements, and
the action comprises disabling a non-redundant power source or, if the at least one of the power sources provide power redundantly, sequentially switching off of the at least one of the power sources and issuing an alert.

9. A system to protect electrical equipment, comprising:
power sources;
loads;
a backplane comprising conductive layers interleaved with dielectric layers, electrically communicative inputs and outputs and power distribution elements supportively disposed within multiple conductive layers by which each input is electrically communicative with at least one or more outputs;
input wiring by which each power source connects with a corresponding input;
input detectors respectively disposed on the input wiring to detect an amount of power provided from each power source to the corresponding input;
output wiring by which each output connects with a corresponding load;
output detectors respectively disposed on the output wiring to detect an amount of power provided from each output to the corresponding load; and
a processor coupled to the input and output detectors and configured to determine that a relationship between the detected amounts of power is indicative of a fault of the power distribution elements and to take an action relative to at least one of the power sources to mitigate the fault based on the determined relationship.

10. The system according to claim 9, wherein:
the power sources comprise a battery and an electric grid, and
current provided from the power sources and current provided to the loads is alternating current (AC) or direct current (DC).

11. The system according to claim 9, further comprising a housing disposed to house the backplane, wherein at least one of the sources is external to the housing.

12. The system according to claim 9, wherein:
the input wiring comprises an individual input wiring element, on which one of the input detectors is disposed, to connect each power source with the corresponding input,
the output wiring comprises an individual wiring element, on which one of the output detectors is disposed, to connect each output with the corresponding load.

13. The system according to claim 9, wherein the processor:
sums the detected amounts of power provided from each power source to arrive at a first summation result,
sums the detected amounts of power provided from each output to arrive at a second summation result,
obtains a difference between the first and second summation results, and
effects the taking of the action relative to the at least one of the power sources based on the difference exceeding a predefined threshold, wherein the taking of the action comprises:
determining whether the power provided from each of the power sources is provided redundantly or from a non-redundant system;
if the power is provided from the non-redundant system, disabling the non-redundant system; and
if the power is provided redundantly, sequentially disabling redundant systems until the difference does not exceed the predefined threshold.

14. The system according to claim 13, wherein the predefined threshold is a 0% or greater differential and is updateable.

15. The system according to claim 9, wherein:
the fault comprises a short circuit passing between voltage planes of proximal power distribution elements, and
the action comprises disabling a non-redundant power source or, if the at least one of the power sources provide power redundantly, sequentially switching off of the at least one of the power sources and issuing an alert.

16. A method of protecting electrical equipment in a system comprising power sources, loads and a backplane that comprises conductive layers interleaved with dielectric layers, electrically communicative inputs and outputs and power distribution elements supportively disposed within multiple conductive layers by which each input is electrically communicative with at least one or more outputs, the method comprising:

detecting, along input wiring, an amount of power provided from power sources to a corresponding input;

detecting, along output wiring, an amount of power provided from each output to a corresponding load;

determining that a relationship between the detected amounts of power is indicative of a short circuit passing between voltage planes of proximal power distribution elements; and taking an action relative to at least one of the power sources to mitigate the short circuit based on the determined relationship.

17. The method according to claim 16, wherein:

the determining comprises summing the detected amounts of power provided from each power source to arrive at a first summation result, summing the detected amounts of power provided from each output to arrive at a second summation result and obtaining a difference between the first and second summation results, and the taking of the action relative to the at least one of the power sources is based on the difference exceeding a predefined threshold and comprises:

determining whether the power provided from each of the power sources is provided redundantly or from a non-redundant system;

if the power is provided from the non-redundant system, disabling the non-redundant system; and if the power is provided redundantly, sequentially disabling redundant systems until the difference does not exceed the predefined threshold.

18. The method according to claim 17, wherein the predefined threshold is a 0% or greater differential and is updateable.

\* \* \* \* \*